(12) United States Patent
Hay et al.

(10) Patent No.: US 11,227,069 B2
(45) Date of Patent: *Jan. 18, 2022

(54) TECHNIQUES AND ARCHITECTURES FOR MANAGING PRIVACY INFORMATION AND PERMISSIONS ACROSS DISPARATE DATABASE TABLES

(71) Applicant: salesforce.com, inc., San Francisco, CA (US)

(72) Inventors: Marla Hay, Portland, OR (US); Michael Allan Friedman, San Francisco, CA (US); Yvonne Zhou, San Francisco, CA (US); Shivan Kaul Sahib, Vancouver (CA)

(73) Assignee: salesforce.com, Inc., San Francisco, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 16/139,619

(22) Filed: Sep. 24, 2018

(65) Prior Publication Data

US 2020/0097680 A1 Mar. 26, 2020

(51) Int. Cl.
*G06F 21/62* (2013.01)
*H04L 29/06* (2006.01)
*G06F 16/9535* (2019.01)

(52) U.S. Cl.
CPC ...... *G06F 21/6263* (2013.01); *G06F 16/9535* (2019.01); *H04L 63/102* (2013.01); *G06F 2221/2141* (2013.01)

(58) Field of Classification Search
CPC ............. G06F 21/6263; G06F 16/9535; G06F 2221/2141; H04L 63/102; H04L 63/0428; H04W 12/02
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |

(Continued)

OTHER PUBLICATIONS

Non-Final Office Action for U.S. Appl. No. 16/140,428 dated Jul. 14, 2020, 8 pages.

(Continued)

*Primary Examiner* — Meng Li
(74) *Attorney, Agent, or Firm* — Kwan & Olynick LLP

(57) ABSTRACT

An indication of an action is received through and application program interface (API) provided by one or more hardware processing devices. The action corresponds to communication with a specified party. Multiple disparate tables stored in at least one database of a of a database environment associated with the one or more hardware processing devices are searched for records having the field property corresponding to the specified party. The field property from the corresponding multiple disparate tables are evaluated. A unified field property is determined based on the evaluation of the field property from the corresponding multiple disparate tables. The unified field property is returned through the API.

21 Claims, 7 Drawing Sheets

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0036586 A1* | 2/2006 | Krakowiecki ...... G06F 16/9535 |
| 2007/0124276 A1 | 5/2007 | Weissman et al. |
| 2009/0177744 A1 | 7/2009 | Marlow et al. |
| 2011/0082854 A1* | 4/2011 | Eidson ............... G06F 16/2462 |
| | | 707/714 |
| 2015/0058314 A1* | 2/2015 | Leclerc .................. G06F 16/27 |
| | | 707/711 |
| 2015/0121545 A1* | 4/2015 | Chandrasekaran ... G06F 16/284 |
| | | 726/27 |
| 2016/0104002 A1 | 4/2016 | Schneider et al. |
| 2016/0105442 A1* | 4/2016 | Movida ................ H04L 65/403 |
| | | 726/28 |
| 2017/0213272 A1* | 7/2017 | Mowatt ............. G06Q 30/0204 |
| 2018/0070144 A1 | 3/2018 | Tang et al. |
| 2018/0213364 A1* | 7/2018 | Segal ...................... H04W 4/33 |
| 2018/0248881 A1* | 8/2018 | Mueller ................ H04W 12/04 |
| 2020/0097680 A1* | 3/2020 | Hay ...................... H04W 12/02 |

OTHER PUBLICATIONS

Final Office Action for U.S. Appl. No. 16/140,428 dated Nov. 2, 2020, 9 pages.

Notice of Allowance for U.S. Appl. No. 16/140,428 dated Aug. 25, 2021, 8 pages.

Non-Final Office Action for U.S. Appl. No. 16/140,428 dated Mar. 15, 2021, 10 pages.

* cited by examiner

TECHNIQUES AND ARCHITECTURES FOR MANAGING PRIVACY INFORMATION AND PERMISSIONS ACROSS DISPARATE DATABASE TABLES

TECHNICAL FIELD

Embodiments relate to techniques and architectures for providing control over privacy and data governance in a complex computing environment having multiple database objects connected to a single entity (e.g., person, position). More particularly, embodiments relate to techniques and architectures for accurate and efficient fine-grain control over privacy and data governance mechanisms between multiple database objects.

BACKGROUND

Computing environments that manage data related to multiple entities (e.g., people, groups, companies, positions, archives) can quickly become complex. For example, within a small office setting an employee may have an employee profile managed by the human resources department and that employee may also have an individual contact entry in a shared contacts database/app/tool. Each of these objects can have different associated permissions, uses, privacy requirements, access rights, etc. In order to operate property and efficiently these should be handled consistently and correctly. Current solutions to this situation are error-prone and cumbersome.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known structures and techniques have not been shown in detail in order not to obscure the understanding of this description.

Various data control, privacy, data governance, data management techniques, structures and mechanisms are described herein. Many examples are presented in terms of privacy permissions and associated principles. However, the techniques and architectures describe herein are more broadly applicable and should not be limited to privacy and data governance.

In one embodiment, an application program interface (API) can be provided within a computing environment that can function to return results related to data permissions, data uses, privacy requirements, access rights, data governance, etc. The results can be based on multiple objects within the computing environment related to a specific entity (e.g., people, groups, companies, positions). For example, an inquiry can be made as to whether a specific individual can be contacted via electronic mail and that inquiry can be submitted through the API and analyzed using information from any number of objects within the computing environment related to that individual. The results can provide a more consistent and efficient and reliable result than could be achieved using previous techniques.

In various embodiments, to accomplish the privacy inquiry, hardware processing components of the computing environment can read, from a database, privacy values from multiple related records across disparate database tables. Those privacy value can be evaluated using, for example, login that include the privacy values and user data. A resulting evaluation can be provided based on the evaluation. In one embodiment, the greatest privacy principle can be applied to help ensure compliance with data governance requirements. Other evaluation techniques can also be supported. Privacy/consent/permission activities can include, for example, processing, contacting, web tracking, email tracking, geotracking, email contact, facsimile message contact, SMS/text messaging, telephone call, profiling, exporting data, forgetting/deleting user/profile, soliciting, storing PII elsewhere, etc.

Figure 1:
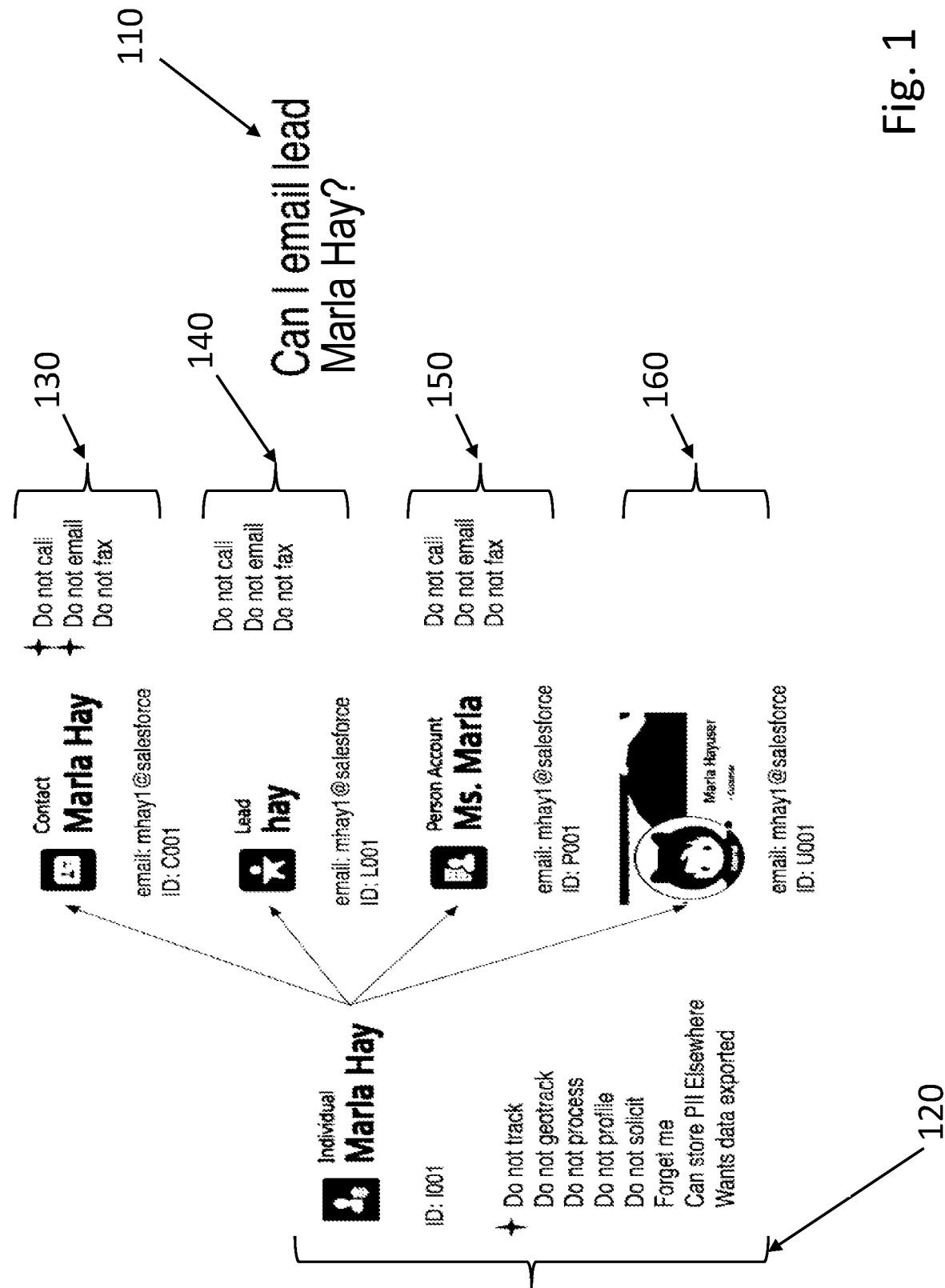
FIG. 1 is a conceptual illustration of a setting in which a privacy inquiry can be evaluated.

FIG. 1 is a conceptual illustration of a setting in which a privacy inquiry can be evaluated. The example of FIG. 1 provides a specific use case based on an inquiry about a proposed communication. However, as discussed above, this is just one example of the techniques described herein. Similar techniques can be utilized, for example, to manage personally identifiable information (PII) or other data management operations.

The example of FIG. 1 considers inquiry 110 ("Can I email lead Marla Hay?"). This type of inquiry may be, for example, the result of the normal course of work for a person in sales that would like to follow up with a contact about a potential sale. The contact may be associated with multiple objects within a customer relationship management (CRM) environment that the salesperson is accessing to manage the sales process.

The entity "Marla Hay" can be associated with multiple different objects across disparate database tables in the host environment. Each object can have an independent set of permissions, preferences and/or privacy rules. In the example of FIG. 1, individual object 120 corresponds to Marla Hay and as an associated set of permissions, preferences and/or privacy rules (e.g., do not track, do not geotrack, do not process, do not profile, do not solicit, forget me, can store PII elsewhere, wants data exported). In the example of FIG. 1, the "Do Not Track" preference is selected.

Individual object 120 can be connected to one or more other objects that are linked to Marla Hay. For example, Contact 130, Lead 140, Person Account 150, and Profile 160. As with Individual object 120, each contact can have its own set of permissions, preferences and/or privacy rules. Because these objects can be created or modified at different times, the corresponding permissions, preferences and/or privacy rules can be inconsistent. In the example of FIG. 1, "Do Not Call" and "Do Not Email" are selected for Contact 130, but not for Lead 140 or Person Account 150.

Thus, the answer to inquiry 110 can depend on which object(s) is/are checked. Using traditional techniques, a user making the inquiry would check one of the objects (e.g., Contact 130) and make a decision based on that object. If that person desired to be more through, they might check multiple objects (e.g., Contact 130 and Person Account 150), which would result in conflicting information. The techniques and architectures described herein can be utilized to provide a consistent and reliable response to these types of inquiries.

In one embodiment, the most restrictive result is utilized. In the example of FIG. 1, Contact 130 indicates "Do Not Email" so the answer to inquiry 110 is "No". In alternate embodiments, when conflicting permissions, preferences or privacy rules are found, the majority option is utilized, which would result in a "Yes" because only one of three "Do Not Email" options are selected. In another embodiment, the most recently updated version can be utilized.

As illustrated in FIG. 1, one or more objects may inherit preferences/privacy settings/etc. from other objects. In some embodiments, only the level(s) having the settings as options are searched. Thus, in the example of FIG. 1, only Individual objects need to be searched for tracking settings. This can optimize the queries for some actions/preferences/settings.

Figure 2:
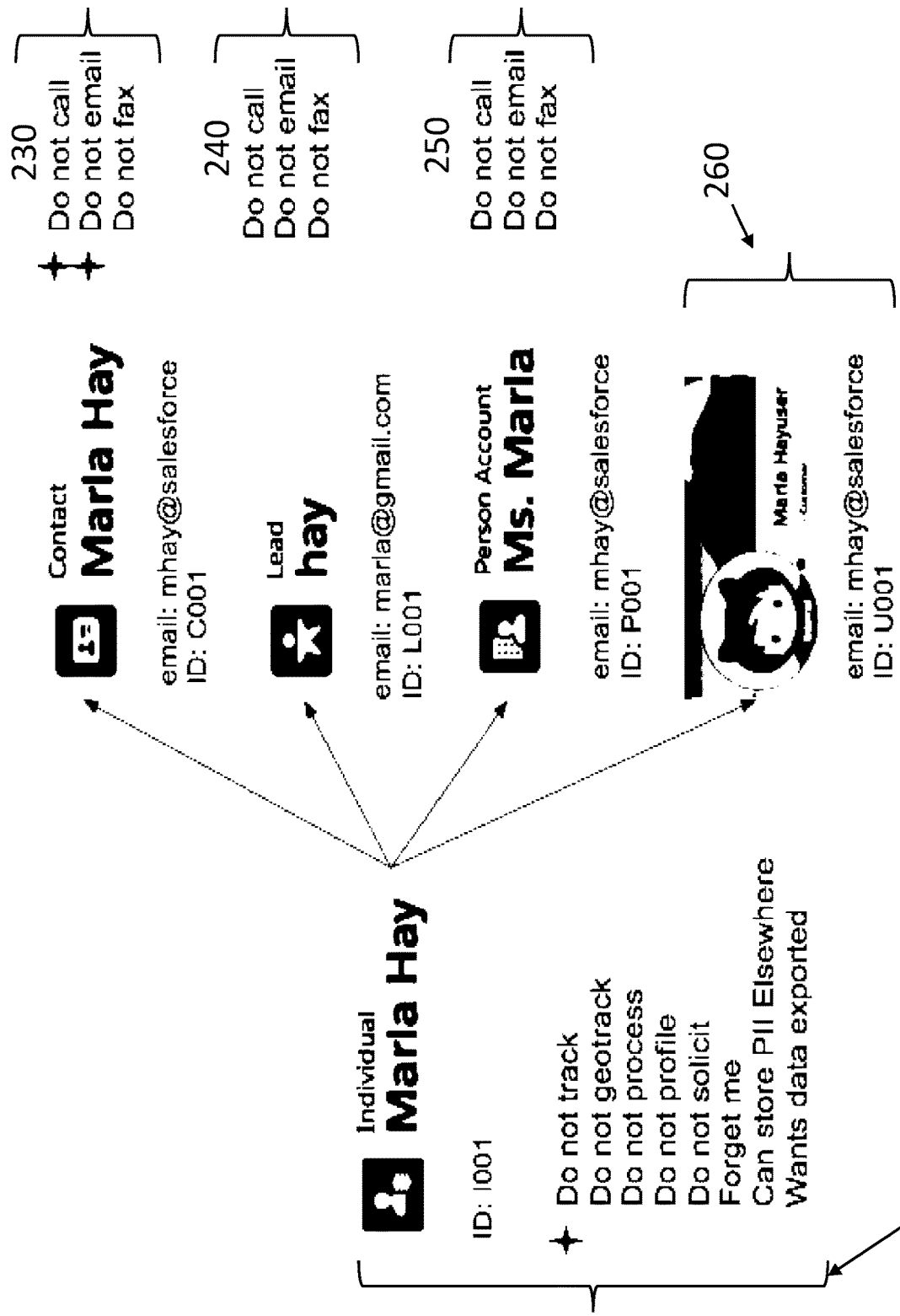
FIG. 2 is a conceptual illustration of a setting in which a privacy inquiry can be evaluated for a contact having multiple email addresses.

FIG. 2 is a conceptual illustration of a setting in which a privacy inquiry can be evaluated for a contact having multiple email addresses. The example of FIG. 2 considers two inquiries: "Can I email?" and "Can I track?" for the objects illustrated in FIG. 2. However, the techniques and structures utilized to address these inquiries can also be applied to other types of data characteristic inquires, for example, can data be moved, is data covered by privacy laws, is the data PII, etc.

In response to the inquiry "Can I email Marla Hay?" the various objects (e.g., 220, 230, 240, 250, 260) associated with "Marla Hay" are evaluated. For Contact object 230, the "Do Not Email" flag (or other indicator) is set, so email contact is not allowed using the email address(es) stored in Contact object 230. Lead object 240 does not have the "Do Not Email" flag (or other indicator) set, so email contact may be allowed. Although Lead object 240 is connected to Contact object 230 (which has the "Do Not Email" flag set, the email addresses in Lead object 240 and Contact object 230 are different. Thus, in one embodiment, email contact can be allowed for using the address of Lead object 240, but not for Contact object 230.

Person Account object 250 does not have the "Do Not Email" flag set, but the associated address is the same as for Contact object 230 so email contact is not allowed. Similarly, object 260 does not have a permission associated with the email address stored therein, but object 260 is linked to Individual object 220 and to Contact object 230, which has the same email address and has the "Do Not Email" flag set, so email contact is not allowed.

Evaluating the two email addresses (mhayATsalesforce.com and marlaATgmail.com) can provide a different result for different email addresses. In the example of FIG. 2, there are two objects (230, 250) with mhayATsalesforce.com email address, one of which has the "Do Not Email" flag set, so no contact is allowed via that email address. The other email address, marlaATgmail.com, is associated with only one object (240) and that object does not have the "Do Not Email" flag set, so contact is allowed with that email address.

As another example of privacy/permission controls, an entity utilizing the environment to which the objects of FIG. 2 belong (e.g., a cloud database environment, a CRM environment) may wish to track an electronic document (e.g., via tracking pixel) belonging to Marla Hay. A similar process can be utilized to determine whether this is permissible. In the example of FIG. 2, Individual object 220 has the "Do Not Track" flag set and the child objects (230, 240, 250, 260) do not have "Do Not Track" flags so they inherit the permissions/restrictions/settings/limitations of the parent object (220). Similarly, both email addresses are associated with child objects so tracking is not permitted with respect to those email addresses.

Figure 3:
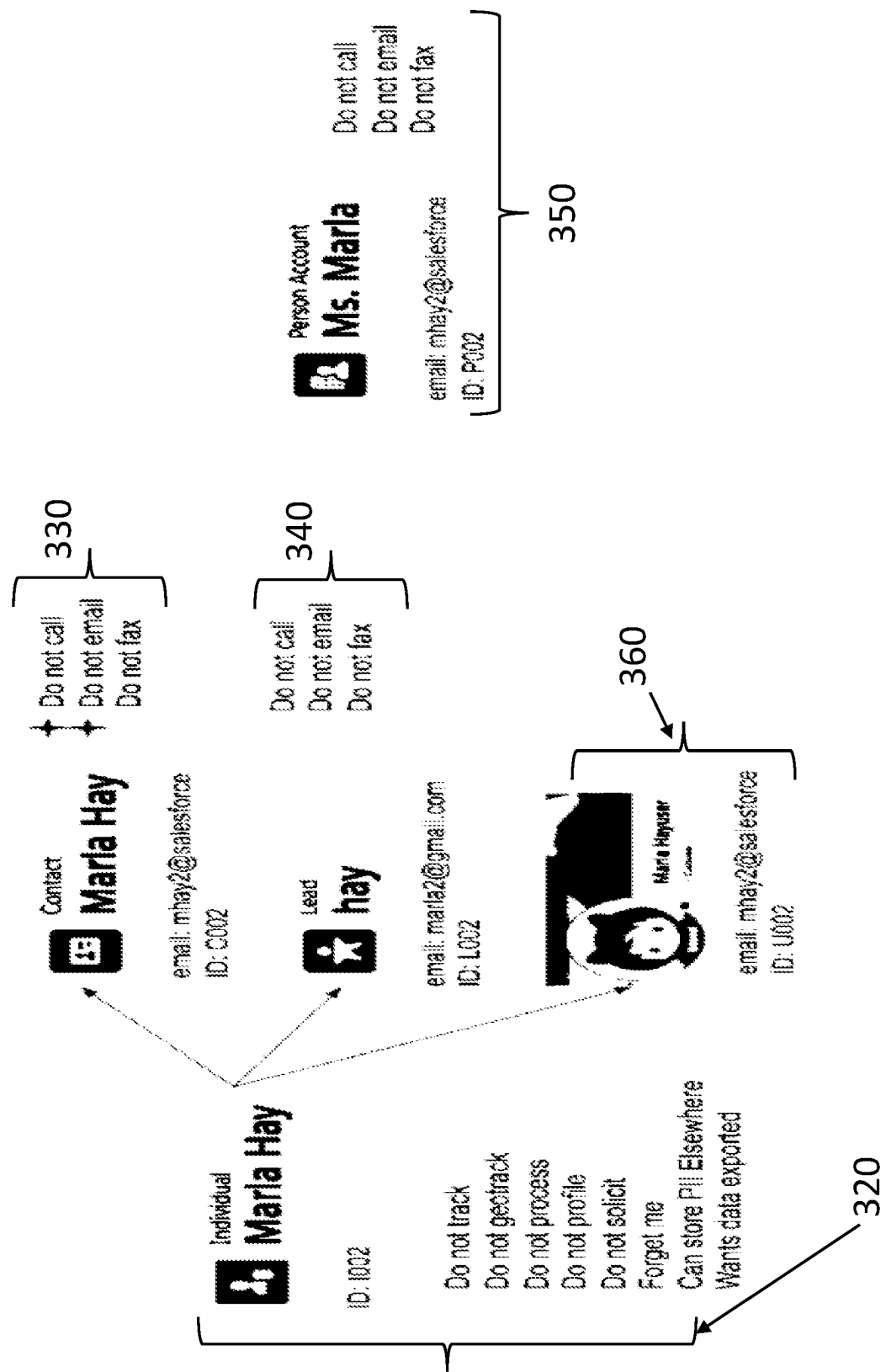
FIG. 3 is a conceptual illustration of a setting in which a privacy inquiry can be evaluated for a contact having multiple email addresses.

FIG. 3 is a conceptual illustration of a setting in which a privacy inquiry can be evaluated for a contact having multiple email addresses. The example of FIG. 3 considers two inquiries: "Can I email?" and "Can I track?" for the objects illustrated in FIG. 3. As discussed above, the techniques and structures utilized to address these inquiries can also be applied to other types of data characteristic inquires, for example, can data be moved, is data covered by privacy laws, is the data PII, etc.

In response to the inquiry "Can I email Marla Hay?" the various objects (e.g., 320, 330, 340, 350, 360) associated with "Marla Hay" are evaluated. For Contact object 330, the "Do Not Email" flag (or other indicator) is set, so email contact is not allowed using the email address(es) stored in Contact object 330. Lead object 340 does not have the "Do Not Email" flag (or other indicator) set, so email contact may be allowed. Although Lead object 340 is connected to Contact object 330 (which has the "Do Not Email" flag set, the email addresses in Lead object 340 and Contact object 330 are different. Thus, in one embodiment, email contact can be allowed for using the address of Lead object 340, but not for Contact object 330.

Person Account object 350 does not have the "Do Not Email" flag set, but the associated address is the same as for Contact object 330 so email contact is not allowed. Similarly, object 360 does not have a permission associated with the email address stored therein, but object 360 is linked to Individual object 320 and to Contact object 330, which has the same email address and has the "Do Not Email" flag set, so email contact is not allowed.

Evaluating the two email addresses (mhayATsalesforce.com and marlaATgmail.com) can provide a different result for different email addresses. In the example of FIG. 3, there are two objects (330, 350) with mhay2ATsalesforce.com email address, one of which has the "Do Not Email" flag set, so no contact is allowed via that email address. The other email address, marla2ATgmail.com, is associated with only one object (340) and that object does not have the "Do Not Email" flag set, so contact is allowed with that email address.

As another example of privacy/permission controls, an entity utilizing the environment to which the objects of FIG. 3 belong (e.g., a cloud database environment, a CRM environment) may wish to track an electronic document (e.g., via tracking pixel) belonging to Marla Hay. In the example of FIG. 3 (unlike the example of FIG. 2), Individual object 320 does not have the "Do Not Track" flag set and the child objects (330, 340, 350, 360) do not have "Do Not Track" flags so they inherit the permissions/restrictions/settings/limitations (or lack thereof) of the parent object (320). Similarly, both email addresses are associated with child objects so tracking is permitted with respect to those email addresses.

In various embodiments, the functionality described herein can be provided through a Representational State Transfer (REST) API. Other types of mechanisms can also be used. In the example that follows: "id" can be a record id or email belonging to entity Individual, Contact, Lead, Person Account, or User. The example objects (Individual, Contact, Lean, Person Account, User) are just example objects from the example started above, and any number and/or any type of objects can be supported. Further, "action" can be one of: email, geotrack, phone, fax, solicit, process, profile, track, portability, store PII elsewhere, forget. These are example actions from the example started above, and any number and/or any type of objects can be supported.

In one embodiment, for getting consent/permission/use/privacy values:

```
GET/consent/action/<action>?ids=<comma separated
    list of ids>[&verbose=true]
    [&aggregatedConsent=true]
``` a. verbose and aggregatedConsent are optional parameters
b. an id can be a record ID or an email address
c. The total length of the URL is limited to 16K characters. This imposes an upper limit of about 800 ids in one request. If the URL exceeds 16K characters, then HTTP 414 "URI too long" is returned.
d. Failure cases (returned in the "Success" parameter):
i. If a record ID is not in the format of a record ID of a record from a consent-related object (User, Individual, Lead, Contact, PersonAccount), error code INVALID_ID will be returned
ii. If no consent info is found from a valid record ID or email address, we return INFO_NOT_FOUND error code
iii. If caller passes the record ID of a Lead that is converted, we return CONVERTED_LEAD_IS_INVALID error
e. Example query
i. GET/consent/action/track?ids=1,2&verbose=true
Response:

```
{
  "1" : {
    "result" : "Success",
    "proceed" : {
      "track" : "false"
    },
    "explanation" : [ {
      "objectConsulted" : "Contact",
      "field" : "HasOptedOutOfTracking",
      "recordId" : "1",
      "value" : "true"
    } ]
  },
  "2" : {
    "result" : "Success",
    "proceed" : {
      "track" : "true"
    },
    "explanation" : [ {
      "objectConsulted" : "Contact",
      "field" : "HasOptedOutOfTracking",
      "recordId" : "2",
      "value" : "false"
    } ]
  }
}
```

Figure 4:
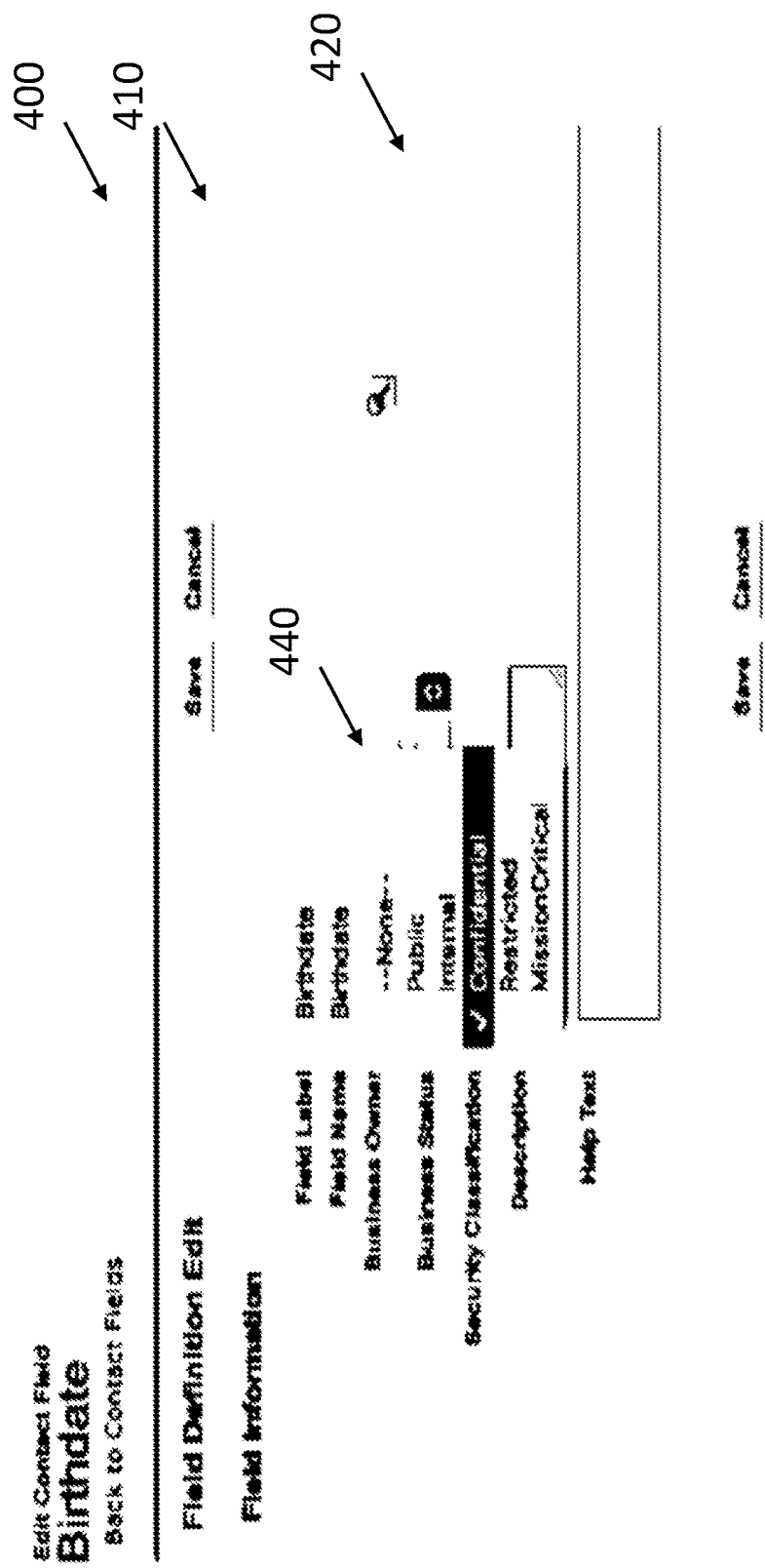
FIG. 4 is one embodiment of a graphical user interface in which a user can modify data classification metadata.

```
GET/consent/multiaction?actions=<comma separated
    list of actions>&ids=<comma separated list of
    ids>[&verbose=true][&aggregatedConsent=true]
``` a. verbose and aggregatedConsent are optional parameters
b. an id can be a record ID or an email address
c. Failure cases (returned in the "Success" parameter):
i. If a record ID is not in the format of a record ID of a record from a consent-related object (User, Individual, Lead, Contact, PersonAccount), error code INVALID_ID will be returned
ii. If no consent info is found from all valid record IDs or email addresses, we return INFO_NOT_FOUND error code
iii. If not consent info is found from all valid record IDs or email addresses, we return MIXED error code
iv. If caller passes the record ID of a Lead that is converted, we return CONVERTED_LEAD_IS_INVALID error
d. Example query 0:
i. GET/consent/multiaction?actions=track, email&ids=1&verbose=true FIG. 4 is one embodiment of a graphical user interface in which a user can modify data classification metadata. In the example of FIG. 4, graphical user interface (GUI) 400 can provide a mechanism through which data classifications can be managed. For example, for a specific field (e.g., Birthdate), the definition of the field can be managed using elements 410, which can include field information 420. In one embodiment, a security classification can be selected/edited/modified with dropdown menu 440.

In one embodiment, one or more fields of the one or more objects utilized has an associated data classification. This data classification can be used to determine data permissions, data uses, privacy requirements, access rights, data governance, etc. as described herein. The following five classifications are examples that can be supported; however, other and/or additional classifications can be utilized: Public, Internal, Confidential, Restricted and Mission Critical.

In one embodiment, public data is data that is for public use. Public data is meant to be viewed, but not altered, by the public. In one embodiment, internal data is data that is appropriate for viewing or use by all member of (or contractors with) an organization that owns the data. In one embodiment, internal Data is not meant to be broadcast publicly but can be shared with customers, partners, and others under NDA.

In one embodiment, confidential data is to be used by a defined subset of the organization that owns the data and/or contractors thereof. In one embodiment, this data is not restricted by law, regulation, or company MSA and can be shared with customers, partners, and others under NDA on an as needed basis. In one embodiment, restricted data is data that is to be used by a very small, defined subset of the owning organization and/or Contractors. This data is likely to be restricted by law, regulation, NDA, or the company MSA.

In one embodiment, mission-critical data is data is critical to the continued success of the owning organization and is key to the company's survivability. This data is meant to be used by a small, defined subset of employees/owners and previously approved contractors or third parties (subject to heightened contractual requirements). This data is almost always restricted by law, regulation, NDA, or a company MSA.

Figure 5:
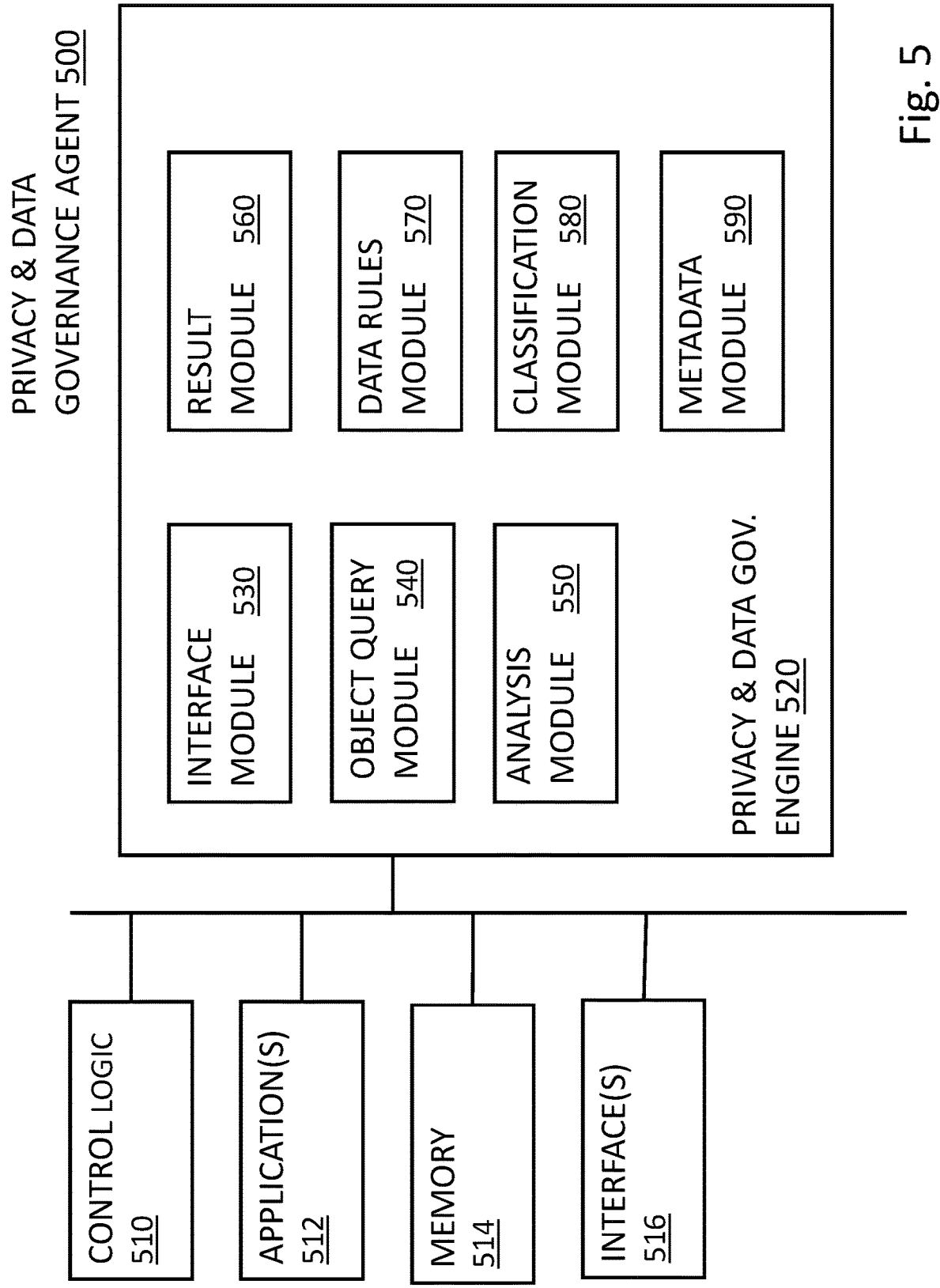
FIG. 5 is a block diagram of one embodiment of a privacy and data governance agent.

FIG. 5 is a block diagram of one embodiment of a privacy and data governance agent. In one embodiment, one or more privacy and data governance agents may exist and/or operate within the host environment. The agent of FIG. 5 may provide functionality as described, for example, with respect to FIGS. 1-4. The agent of FIG. 5 may also provide additional functionality.

In one embodiment, privacy and data governance agent 500 includes control logic 510, which implements logical functional control to direct operation of privacy and data governance agent 500, and/or hardware associated with directing operation of privacy and data governance agent 500. Logic may be hardware logic circuits and/or software routines. In one embodiment, privacy and data governance agent 500 includes one or more applications 512, which represent a code sequence and/or programs that provide instructions to control logic 510.

Privacy and data governance agent 500 includes memory 514, which represents a memory device and/or access to a memory resource for storing data and/or instructions. Memory 514 may include memory local to privacy and data governance agent 500, as well as, or alternatively, including memory of the host system on which privacy and data governance agent 500 resides. Privacy and data governance agent 500 also includes one or more interfaces 516, which represent access interfaces to/from (an input/output interface) privacy and data governance agent 500 with regard to entities (electronic or human) external to privacy and data governance agent 500.

Privacy and data governance agent 500 also includes privacy and data governance engine 520, which represents one or more functions or module that enable privacy and data governance agent 500 to provide the index backups as described above. The example of FIG. 4 provides several modules that may be included in privacy and data governance engine 520; however, different and/or additional modules may also be included. Example modules that may be involved in providing the privacy and data governance functionality described herein include, for example, interface module 530, object query module 540, analysis module 550, result module 560, data rules module 570, classification module 580 and metadata module 590. Each of these modules may further include other sub-modules to provide other functions. As used herein, a module refers to routine, a subsystem, logic circuit, microcode, etc., whether implemented in hardware, software, firmware or some combination thereof.

In one embodiment, interface module 530 provides a standard interface that can be utilized to answer inquiries about privacy and/or data governance restrictions, preferences, classifications, etc. In one embodiment, interface module 530 provides utilizes at least a REST API to receive parameters related to an inquiry. In alternate embodiments, interface module 530 can provide a different type of interface, for example, a natural language interface.

In one embodiment, object query module 540 operates to interpret the inquiry received from/through interface module 530 and functions to perform a query on one or more objects in a host environment. For example, object query module 540 could check one or more related objects within the host environment for permissions, uses, privacy requirements, access rights, etc., corresponding to the inquiry.

In one embodiment, analysis module 550 operates on results from one or more queries performed by object query module 540 to determine if the proposed action is appropriate in response to analysis of the permissions, uses, privacy requirements, access rights of the various objects queried by object query module 540. In one embodiment, result module 560 generates a result from the analysis of analysis module 550 that can be communicated via interface module 530 to the source of the inquiry.

In one embodiment, data rules module 570 operates to maintain various rules for data management/governance. For example, data rules module 570 can maintain the classifications discussed above. As another example, data rules module 570 can maintain jurisdictional rules for various types of data (e.g., PII).

In one embodiment, classification module 580 operates to receive and/or communicate classification information (e.g., FIG. 4) related to various data fields. In one embodiment, metadata module 590 operates to manage and/or store metadata related to the privacy and data governance activities described herein.

Various embodiments of the techniques herein can be provided within an on-demand services environment. The on-demand services environment can include a multitenant database environment to support multiple clients while maintaining privacy and data protection between clients. Various embodiments are described in greater detail below.

Figure 6:
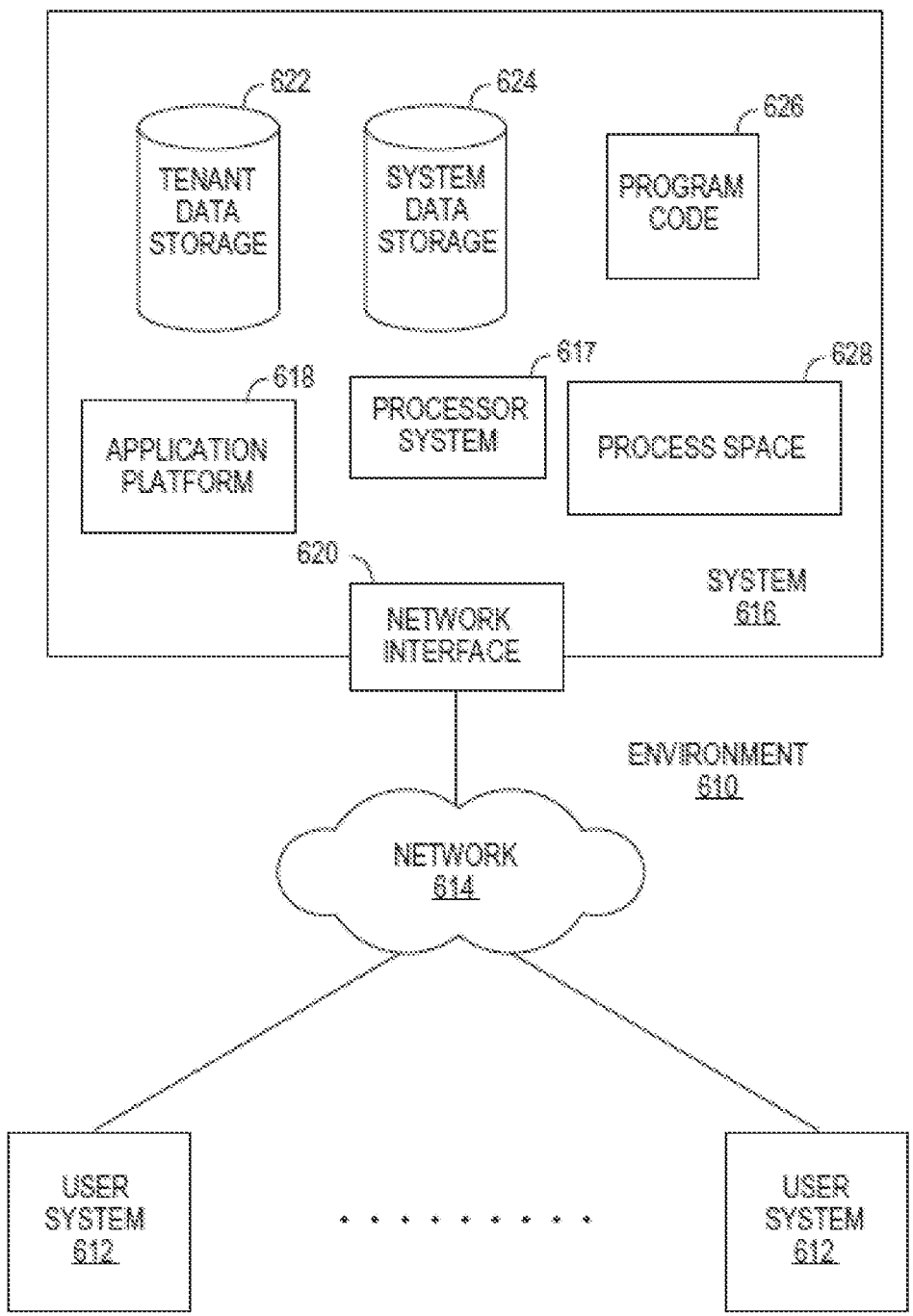
FIG. 6 illustrates a block diagram of an environment where an on-demand database service might be used.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core series processor or the like. Similarly, system 616 (and additional instances of an MTS, where more than one is present) and all of their components might be operator configurable using application(s) including computer code to run using a central processing unit such as processor system 617, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
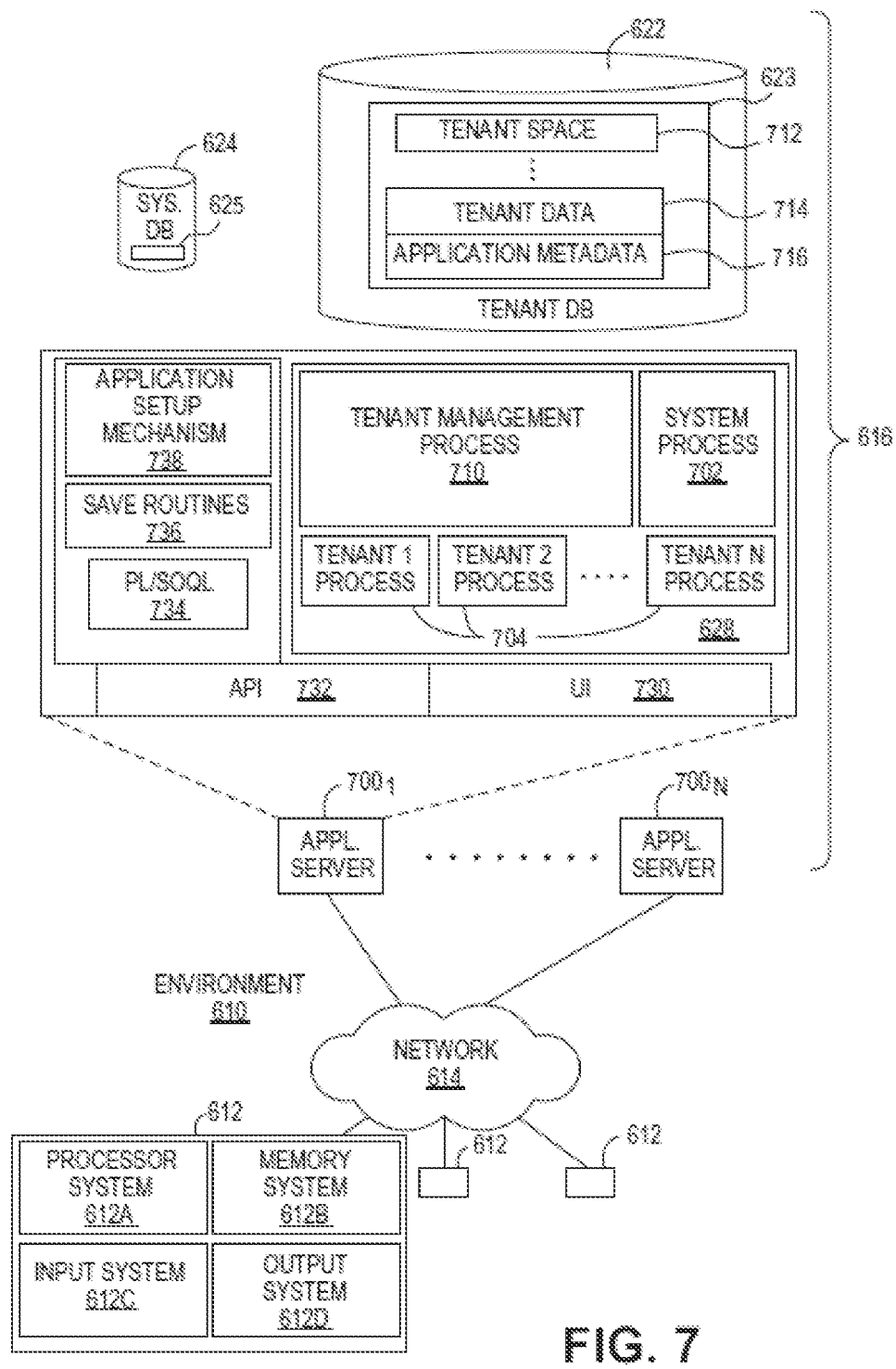
FIG. 7 illustrates a block diagram of another environment where an on-demand database service might be used.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service," issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 BIG-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
receiving an indication of an action through an application program interface (API) provided by one or more hardware processing devices, wherein the action corresponds to data activity associated with a specified party having one or more privacy characteristics;
searching, with the one or more hardware processing devices, multiple disparate tables stored in at least one database for records having corresponding privacy characteristics for the specified party, the specified party having entries in more than one of the multiple disparate tables and multiple different object types having independent sets of permissions, preferences and privacy rules with privacy characteristics differing between the entries;

evaluating, with the one or more hardware processing devices, privacy characteristics for the specified party based on the entries from the corresponding multiple disparate tables;

determining, with the one or more hardware processing devices, a unified privacy result based on the evaluation of the field from the permissions, preferences and privacy rules corresponding to objects representing the specified party in the multiple disparate tables; and returning, with the one or more hardware processing devices, the privacy result through the API, the privacy result indicating whether the action is to be allowed.

2. The method of claim 1, wherein the API comprises a representational state transfer (REST) API.

3. The method of claim 1, wherein the data activity comprises one or more of: processing, contacting, web tracking, email tracking, geotracking, or email contact.

4. The method of claim 1, wherein the data activity comprises one or more of: facsimile message contact, SMS/text messaging, or telephone call.

5. The method of claim 1, wherein the data activity comprises one or more of: profiling, exporting data, forgetting/deleting user/profile, soliciting, or storing personally identifiable information (PII) elsewhere.

6. The method of claim 1, wherein the evaluation is based on privacy parameters.

7. The method of claim 1, wherein the database environment is a multitenant environment.

8. A non-transitory computer-readable medium having stored thereon instructions that, when executed by one or more processors, are configurable to cause the one or more processors to:

receive an indication of an action through an application program interface (API) provided by one or more hardware processing devices, wherein the action corresponds to data activity associated with a specified party having one or more privacy characteristics;

search, with the one or more hardware processing devices, multiple disparate tables stored in at least one database for records having corresponding privacy characteristics for the specified party, the specified party having entries in more than one of the multiple disparate tables and multiple different object types having independent sets of permissions, preferences and privacy rules with privacy characteristics differing between the entries;

evaluate, with the one or more hardware processing devices, privacy characteristics for the specified party based on the entries from the corresponding multiple disparate tables;

determine, with the one or more hardware processing devices, a unified privacy result based on the evaluation of the permissions, preferences and privacy rules corresponding to objects representing the specified party in the multiple disparate tables; and return, with the one or more hardware processing devices, the privacy result through the API, the privacy result indicating whether the action is to be allowed.

9. The non-transitory computer-readable medium of claim 8, wherein the API comprises a representational state transfer (REST) API.

10. The non-transitory computer-readable medium of claim 8, wherein the data activity comprises one or more of: processing, contacting, web tracking, email tracking, geotracking, or email contact.

11. The non-transitory computer-readable medium of claim 8, wherein the data activity comprises one or more of: facsimile message contact, SMS/text messaging, or telephone call.

12. The non-transitory computer-readable medium of claim 8, wherein the data activity comprises one or more of: profiling, exporting data, forgetting/deleting user/profile, soliciting, or storing personally identifiable information (PII) elsewhere.

13. The non-transitory computer-readable medium of claim 8, wherein the evaluation is based on privacy parameters.

14. The non-transitory computer-readable medium of claim 8, wherein the database environment is a multitenant environment.

15. A system comprising:

a physical memory system;

one or more hardware processors coupled with the physical memory system, the one or more hardware processors to receive an indication of an action through an application program interface (API) provided by one or more hardware processing devices, wherein the action corresponds to data activity associated with a specified party having one or more privacy characteristics, to search, with the one or more hardware processing devices, multiple disparate tables stored in at least one database for records having corresponding privacy characteristics for the specified party, the specified party having entries in more than one of the multiple disparate tables and multiple different object types having independent sets of permissions, preferences and privacy rules with privacy characteristics differing between the entries, to evaluate, with the one or more hardware processing devices, privacy characteristics for the specified party based on the entries from the corresponding multiple disparate tables, to determine, with the one or more hardware processing devices, a unified privacy result based on the evaluation of the permissions, preferences and privacy rules corresponding to objects representing the specified party in the multiple disparate tables, and to return, with the one or more hardware processing devices, the privacy result through the API, the privacy result indicating whether the action is to be allowed.

16. The system of claim 15, wherein the API comprises a representational state transfer (REST) API.

17. The system of claim 15, wherein the data activity comprises one or more of: processing, contacting, web tracking, email tracking, geotracking, or email contact.

18. The system of claim 15, wherein the data activity comprises one or more of: facsimile message contact, SMS/text messaging, or telephone call.

19. The system of claim 15, wherein the data activity comprises one or more of: profiling, exporting data, forgetting/deleting user/profile, soliciting, or storing personally identifiable information (PII) elsewhere.

20. The system of claim 15, wherein the evaluation is based on privacy parameters.

21. The system of claim 15, wherein the database environment is a multitenant environment.

* * * * *